United States Patent
Thompson et al.

(10) Patent No.: US 8,535,842 B2
(45) Date of Patent: Sep. 17, 2013

(54) COMBUSTION-THAWED FUEL CELL

(75) Inventors: Eric L. Thompson, Honeoye Falls, NY (US); Robert L. Fuss, Spencerport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1441 days.

(21) Appl. No.: 11/112,129

(22) Filed: Apr. 22, 2005

(65) Prior Publication Data
US 2006/0240300 A1    Oct. 26, 2006

(51) Int. Cl.
*H01M 2/38*    (2006.01)

(52) U.S. Cl.
USPC ........... 429/457; 429/408; 429/441; 429/456; 429/458; 429/514; 429/518

(58) Field of Classification Search
USPC ......... 429/13, 24, 26, 38, 408, 441, 456–458, 429/514, 518
See application file for complete search history.

(56) References Cited

U.S. PATENT DOCUMENTS

| | | | |
|---|---|---|---|
| 5,009,968 A | 4/1991 | Guthrie et al. | 429/26 |
| 6,068,941 A | 5/2000 | Fuller et al. | 429/13 |
| 6,103,410 A * | 8/2000 | Fuller et al. | 429/429 |
| 6,268,075 B1 | 7/2001 | Autenrieth et al. | 429/17 |
| 6,358,638 B1 | 3/2002 | Rock et al. | 429/13 |
| 6,555,261 B1 * | 4/2003 | Lewinski et al. | 429/513 |
| 6,828,055 B2 * | 12/2004 | Kearl | 429/423 |
| 2001/0036568 A1 | 11/2001 | Farkash et al. | 429/26 |
| 2004/0053092 A1 | 3/2004 | Kato et al. | 429/22 |
| 2004/0101728 A1 * | 5/2004 | Enjoji et al. | 429/26 |
| 2004/0101736 A1 * | 5/2004 | Tawfik et al. | 429/37 |
| 2004/0247967 A1 * | 12/2004 | Resnick et al. | 429/26 |
| 2005/0058865 A1 | 3/2005 | Thompson et al. | 429/26 |

FOREIGN PATENT DOCUMENTS

| | | |
|---|---|---|
| EP | 1283558 | 2/2003 |
| JP | 5-89900 | 4/1993 |
| JP | 118-167424 | 6/1996 |

* cited by examiner

*Primary Examiner* — Patrick Ryan
*Assistant Examiner* — Ben Lewis
(74) *Attorney, Agent, or Firm* — Fraser Clemens Martin & Miller LLC; J. Douglas Miller

(57) ABSTRACT

Combustion heaters having internal combustion chambers are located adjacent the end cells of a stack of fuel cells to directly, conductively heat the end cells during cold start-up of the stack. Similar heater(s) may also be located within the stack when cold starting under extremely cold conditions. A method of combustion thawing a fuel cell stack is described.

14 Claims, 4 Drawing Sheets

COMBUSTION-THAWED FUEL CELL

TECHNICAL FIELD

This invention relates to cold-starting $H_2$-air fuel cell stacks, and more particularly to directly conductively heating the stacks with heat generated in combustion chambers adjacent some of the stack's cells.

BACKGROUND OF THE INVENTION

Hydrogen-air ($H_2$-air) fuel cells are well known in the art, and have been proposed as a power source for many applications. In such fuel cells, hydrogen is the anode reactant (i.e. fuel), oxygen from air is the cathode reactant (i.e. oxidant), and water is the reaction product. The hydrogen is provided from a $H_2$-source such as stored $H_2$, or $H_2$ formed by the reformation of a hydrogenous (i.e. hydrogen-containing) material such as gasoline or methanol. A plurality of individual cells are commonly bundled together to form a fuel cell "stack" which comprises a pair of end cells sandwiching a plurality of inboard cells therebetween.

There are several known types of $H_2$-air fuel cells including aqueous-acid-type, aqueous-alkaline-type, and Proton-Exchange-Membrane-type (PEM). PEM fuel cells have potential for high power densities, and accordingly are desirable for motive-power/vehicular-propulsion applications (e.g. electric vehicles). PEM fuel cells include a "membrane electrode assembly" (a.k.a. MEA) comprising a thin, proton-transmissive, solid polymer membrane-electrolyte having an anode on one of its faces and a cathode on its opposite face. The membrane is typically made from ion exchange resins such as perfluoronated sulfonic acid. The anode and cathode typically comprise finely divided catalyst particles admixed with proton conductive resin. The catalyst particles are often supported on carbon particles. The MEA is sandwiched between a pair of electrically conductive current collectors which contain a network of reactant flow channels therein defining a so-called "flow field" for distributing the $H_2$ and air over the surfaces of the respective anode and cathode catalysts. The inboard cells are defined by bipolar such current collectors, often called "bipolar electrodes". The end cells are defined by a bipolar electrode on one side (i.e. confronting the stack) and a cell end plate, often called a "monopolar electrode" on the other side (i.e. facing away from the stack). A pair of current-collecting terminal plates, one at each end of a fuel cell stack, engage the monopolar cell plates of the end cells to collect the current produced by the stack and direct it to an external electrical load (e.g. a propulsion motor) powered by the stack. Compression plates, on the extreme ends of the stack, outboard the current-collecting terminal plates, are attached either to side plates, or to tie-bolts, that extend the length of the stack, and serve to hold the stack together under compression. An insulating plate electrically insulates the compression plates from the current-collecting terminal plates.

The exothermic, current-producing electrochemical $H_2+O_2 \rightarrow H_2O$ reaction produces, product water in situ within the cell during the normal operation of the fuel cell. In the case of aqueous-acid or aqueous-alkaline fuel cells, this product water is taken up by the electrolyte, and hence does not freeze when the fuel cell is stored in a below-freezing environment. However, in a PEM fuel cell, the product water can freeze within the stack which (1) can plug/clog the reactant flow fields with ice, and prevent or restrict reactant gas flow, (2) can damage the polymer membranes, and (3) can exert deleterious pressures within the cells resulting from expansion of the water during freezing. Accordingly, it is known to dehydrate PEM fuel cells before storing them under freezing conditions. However, starting-up a frozen PEM stack still produces product water that can condense, freeze and damage and/or ice-clog the stack by blocking flow of the cell's reactants, especially in the flow-field and header/manifold regions near the current collectors which are particularly susceptible to ice-clogging. Even when ice-clogging is not an issue (e.g. in aqueous-acid/aqueous-alkaline fuel cells), poor performance from end cells, during cold start-up, prolongs the time it takes before the stack can generate full power. End cells perform worse than inboard cells because (1) the stack's current-collecting terminal plates are heat sinks that draw heat out of the end cells, and (2) there is only one MEA heating the end cells (i.e. in contrast to multiple MEAs heating the inboard cells) when drawing current from the stack during cold start.

SUMMARY OF THE INVENTION

The present invention contemplates method and apparatus for cold-starting $H_2$-air fuel cell stacks under moderately cold conditions (e.g. ca. −20° C.) by directly conductively heating the end cells of the stack with heat generated from the catalytic combustion of $H_2$ in combustion heaters adjacent the end cells of the stack. Under extremely cold conditions (e.g. −40° C.), the invention further contemplates providing one or more combustion heaters interjacent a pair(s) of inboard cells. Preferably, the combustion heaters comprise combustion chambers housed within the stack's current-collecting terminal plates for heating the end cells. Alternatively, the combustion chambers of the present invention could be housed in the monopolar end plates of the end cells for heating the end cells. Combustion heaters located between inboard cells may be discrete heaters, or formed in one or more of the bipolar electrodes that separate one cell from the next.

Apparatus-wise, the preferred embodiment of the invention contemplates a fuel cell stack comprising a plurality of individual fuel cells inboard of, and sandwiched between, a pair of end cells whose monopolar end plates are engaged by electrically-conductive, current-collecting terminal plates each of which houses a catalytic combustion chamber therein. Under moderate temperature conditions the inboard cells are sufficiently internally heated by heat from the exothermic electrochemical $H_2$-air reaction, and by Joule heating produced by current flowing through the stack as not to require combustion heaters within the stack. Under extremely cold conditions, additional heat is provided to the inboard cells by interposing one or more combustion heaters between adjacent cells in the stack. Multiple heaters may be positioned between all of the inboard cells or at intervals throughout the stack (e.g. between every third cell). The cells are externally heated in accordance with the present invention by burning a sub-LEL mixture of hydrogen and air in the catalytic combustion chambers to directly conductively heat the cells adjacent thereto (e.g. the end cells). By sub-LEL mixture is meant a combustible mixture of hydrogen and air that is below its lower explosive limit (LEL) [i.e. is less-than-4% by volume $H_2$]. Preferably, the combustible mixture supplied to the combustion chambers comprises $\leq 3.5\%$ by vol. $H_2$.

The combustion heaters need not uniformly heat the entire cell, but rather could be configured to heat only selected regions of the cells (e.g. flow field headers/manifolds) that are more susceptible to clogging with ice than other parts of the flow field. The length of time the heaters are supplied with $H_2$ will vary with the starting temperature of the stack, the size of the combustion heaters, and the prescribed "heater-off" target temperatures.

The catalytic combustion heaters may be controlled manually or automatically via a controller responsive to the flow rate of air to the combustion chamber and/or to end cell temperatures. The flow rate of $H_2$ to the combustion chambers is preferably controlled by means of modulateable $H_2$ injectors that inject $H_2$ into the stream of air that supplies the combustion chambers. The $H_2$ injection rate is correlated to the flow rate of the air entering the combustion chamber which may be directly measured, or determined from the speed of the compressor supplying the air to the system. $H_2$ flow continues until the temperature of the end cells is raised to a prescribed, above-freezing, target temperature that is preferably about 20° C., and most preferably about 40° C.

In another embodiment, a clock/timer starts running as soon as the hydrogen begins to flow through the injectors, and, after a prescribed interval of time has elapsed, shuts off the hydrogen flow. This interval of time may be the same for all starting temperatures, or may be adjusted to be longer for colder starts than for warmer starts. In this later regard, the duration of this time interval is controlled by a controller that receives a starting temperature input from a sensor that senses either the end cell temperature, or the ambient temperature, and, using an empirically-derived look-up table, ascertains an appropriate heating interval for that particular starting temperature. In its simplest variant, the hydrogen injectors are manually activated/deactivated by the fuel cell operator for an experientially-learned, self-determined period of time.

Preferably, a layer of thermal insulation is provided between the current-collecting terminal plates and the ambient (e.g. between the current-collecting terminal plates and the compression plates at the ends of the stack) to reduce heat loss from the end cells, and terminal plates, and to permit the temperatures of the end cells to rise at about the same rate as the temperatures of the inboard cells.

The heaters' combustion chambers include an $H_2$-air flow field comprising a plurality of flow channels configured to distribute the $H_2$-air mixture throughout the plate chambers. The combustion catalyst is preferably located only in certain regions of the flow field selected to achieve more uniform/even heating of the heater, and to prevent hot spots from occurring near the inlet to the flow field. Preferably, the flow channels of the hydrogen-air flow field slope downwardly toward the flow-field's exit to insure complete drainage of reaction water from the combustion chamber. Most preferably, a hydrophobic coating (e.g. PTFE) is applied to at least some of the surfaces defining the flow channels to further facilitate water drainage.

Method-wise, the invention comprehends starting-up a cold $H_2$-air fuel cell stack by: providing a catalytic combustion chamber adjacent the stack's end cells, and between some inboard cells, if needed; supplying $H_2$ and air to the combustion chamber; exothermically, chemically reacting the $H_2$ and air in the combustion chamber to generate heat and water; conducting the heat, so generated, directly into the stack's end cells (and inboard cells when applicable) when cold-starting the stack; and draining product water from the combustion chambers. Preferably, the combustion chambers for heating the end cells are housed in the stack's current-collecting terminal plates. Hydrogen flow is modulated in response to the flow rate of air to the combustion chambers and is determined from either the compressor speed or from pressure drop measurements taken across a fixed size orifice in the line that supplies air to the combustion chamber. In either case, the $H_2$ flow is adjusted so as to provide a combustible $H_2$-air mixture to the combustion chambers that is below the LEL, and preferably $\leq 3.5\%$ by volume.

BRIEF DESCRIPTION OF THE DRAWINGS

The invention will be better understood when considered in the light of the following detailed description of certain specific embodiments thereof which is given hereafter in conjunction with the following drawings in which.

DESCRIPTION OF SPECIFIC EMBODIMENTS

The invention is illustrated hereafter in the context of a PEM fuel cell stack, it being understood that the invention is also applicable to other $H_2$-air fuel cell stacks of the types mentioned above.

Figure 1:
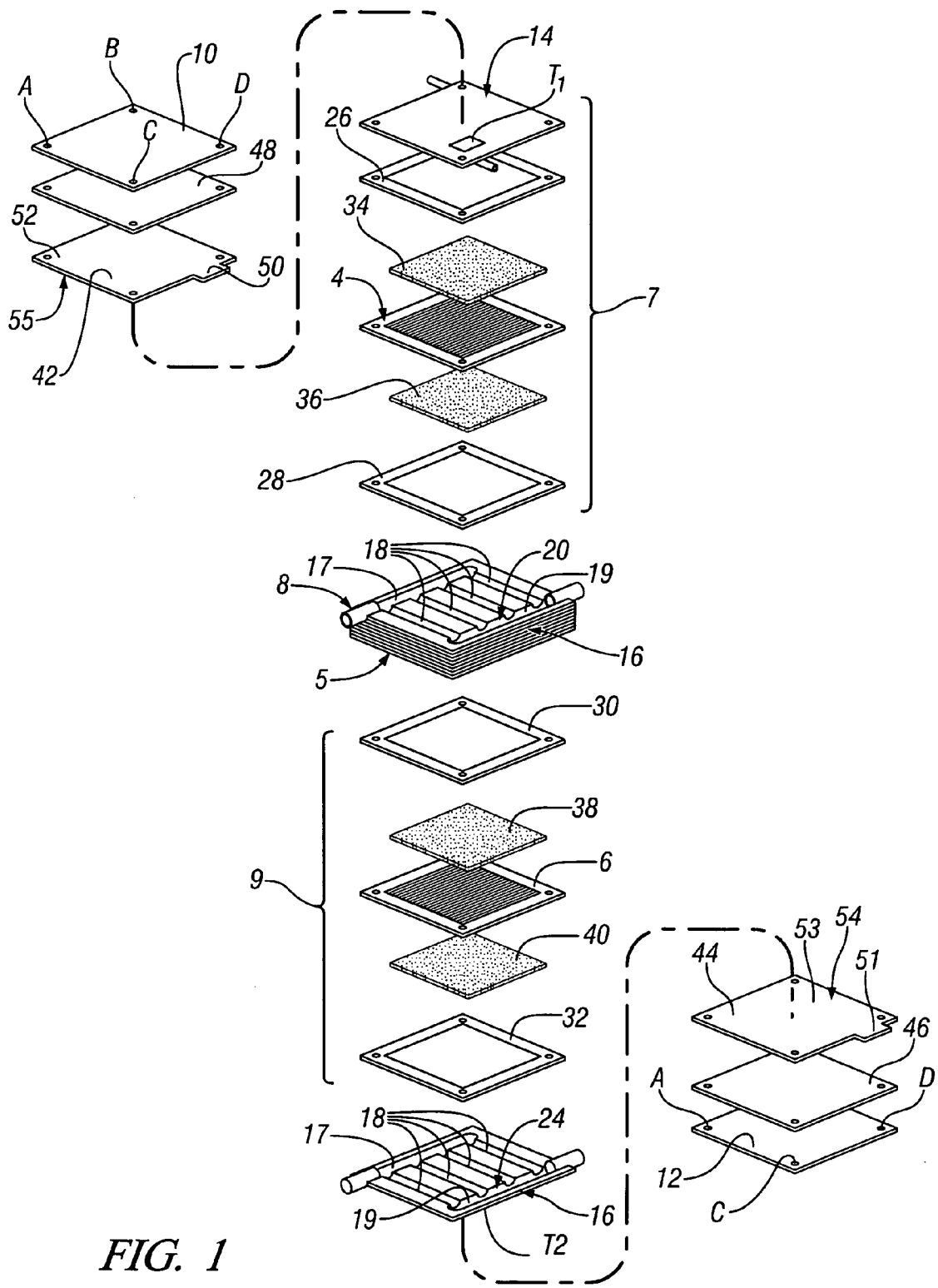
FIG. 1 is an exploded, isometric view of one embodiment of a combustion-thawed PEM fuel cell stack.

FIG. 1 depicts a PEM fuel cell stack having a plurality of inboard cells 5 sandwiched between a pair of end cells 7 and 9 (shown in exploded view), each comprising a membrane-electrode-assembly (MEA) 4 and 6, respectively. Each inboard cell is separated from the next adjacent cell in the stack by an electrically conductive, liquid-cooled, titanium, bipolar electrode/plate 8. The end cells 7 and 9 are separated from the inboard cells by a bipolar electrode/plate 8 and from the end of the stack by a monopolar, current-collecting, titanium, cell end plate 14 and 16. The several cells are stacked together between stainless steel, compression stack end plates 10 and 12 at the ends of the stack. The monopolar, current-collecting cell end plates 14 and 16, as well as the several bipolar plates (e.g. 8), each contain flow fields 20 and 24 comprising a plurality of flow channels 18 extending across the faces of the plates for distributing fuel and oxidant gases to the anode and cathode faces of the MEAs 4 and 6. Inlet and outlet manifolds 17 and 19, respectively, supply and exhaust a reactant gas (i.e. $H_2$ or air) to and from the flow channels 18. Nonconductive gaskets 26, 28, 30, and 32 provide seals and electrical insulation between the several plates of the fuel cell stack. Porous, gas permeable, electrically-conductive sheets 34, 36, 38 and 40 (known as "diffusion media") press up against the electrode faces of the MEAs 4 and 6 and serve as primary current collectors for the electrodes, as well as mechanical supports for the MEAs 4 and 6 where they span flow channels 18 in the flow field 20, 24. Suitable primary current collectors include carbon/graphite paper/cloth, fine mesh noble metal screens, open cell noble metal foams, and the like, which conduct current from the electrodes while allowing gas to pass therethrough to react on the electrodes. The current-collecting, monopolar cell end plates 14 and 16 press up against the primary current collectors 34 and 40 respectively, while the bipolar plates 8 press up against the primary current collector 36 on the anode face of MEA 4, and against the primary current collector 38 on the cathode face of MEA 6. Air is supplied to the cathode side of the fuel cell stack from a compressor (not shown) via appropriate supply plumbing. Hydrogen may be supplied to the anode side of the fuel cell from a storage tank (not shown) or from a reformer that catalytically generates hydrogen from hydrogenous materials such as methanol or gasoline. Exhaust plumbing (not shown) for both the $H_2$ and air sides of the cells are also provided, along with additional plumbing (not shown) for supplying and exhausting liquid coolant to/from the stack, as may be needed.

Electrically insulated tension bolts (not shown), extending through the corner holes A, B, C, and D of the stack's components (e.g. plates, gaskets etc) may be used to clamp the several cells together between the compression plates 10 and 12 to form the stack. Alternatively, the compression plates 10 and 12 may be bolted to side plates (not shown) that extend the length of the sides of the stack.

Aluminum stack terminal plates 52 and 54 each have a heating face 53 and 55 respectively that press up against the monopolar, current-collecting, cell end plates 14 and 16, respectively, and serve as the current-collecting terminals for the entire stack. Terminal tabs 50, 51 project from the terminal plates 52 and 54 for connecting the plates 52 and 54 to an external electrical load (e.g. a propulsion motor) via a load-circuit (not shown). A layer 46, 48 of electrical-thermal insulation (e.g. Delrin® acetal resin plate, silicon foam, or the like) is provided at each end of the stack, between the terminal plates 52, 54 and the ambient (i.e. between the terminal plates 52, 54 and the stack end plates 10, 12) to electrically and thermally insulate the terminal plates 52, 54 from the stack end plates 10, 12, to prevent electrical short-circuiting, and to reduce heat losses from the end cells, and any combustion heaters associated therewith.

Figure 2:
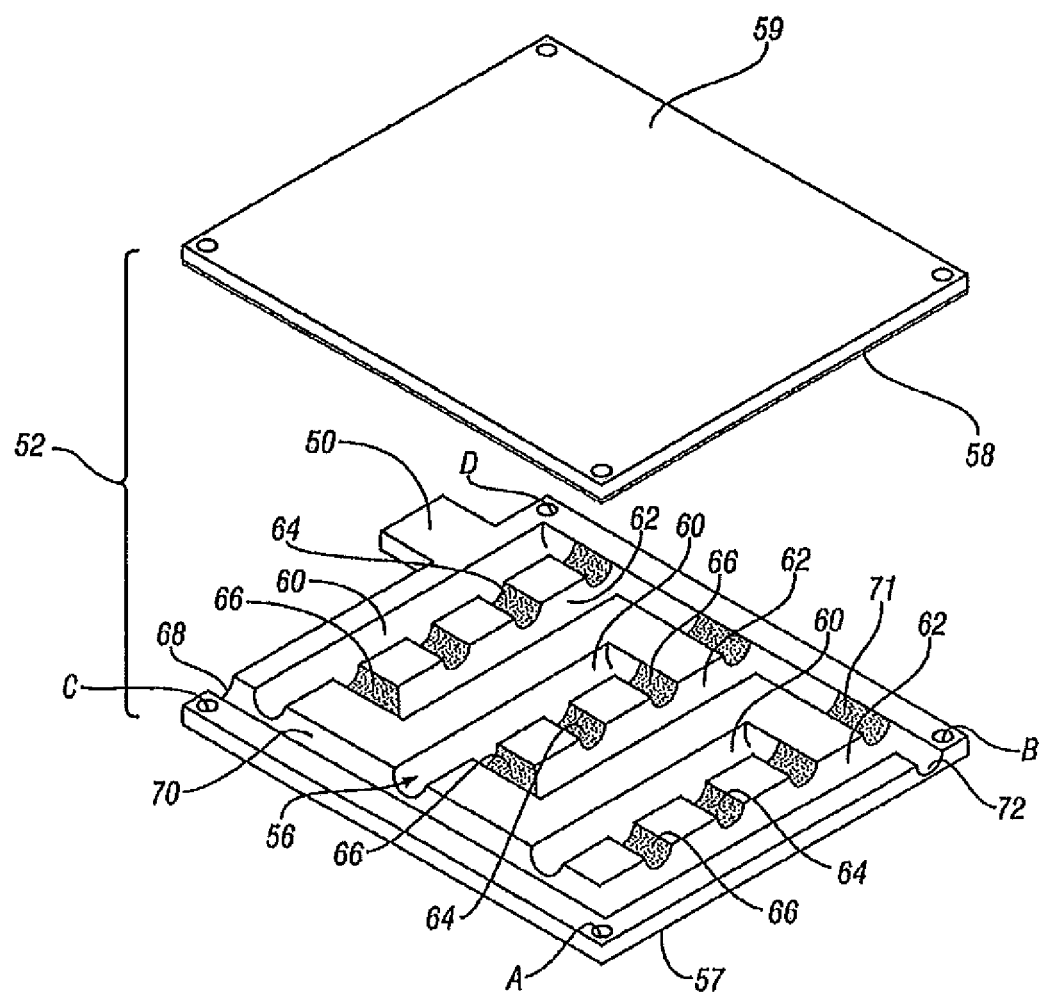
FIG. 2 is an exploded, isometric view of a current-collecting terminal plate in accordance with one embodiment the present invention.

According to a preferred embodiment, and as best shown in FIG. 2, the stack's current-collecting terminal plates 52 and 54 have a combustion chamber 56 housed therein. The terminal plates are each preferably formed in two parts, 57 and 59. One part 57 has the combustion chamber 56 formed therein, while the other part 59 is bonded (e.g. soldered, brazed, welded, glued etc.) to the one part 57 to seal off the combustion chamber 56. The combustion chamber 56 comprises a plurality of header channels 60 coupled to a plurality of downstream, footer channels 62 via a plurality of shorter intermediate channels 64. An inlet 68 admits an $H_2$-air mixture to an inlet manifold channel 70 that supplies the header channels 60. An outlet 72 discharges $H_2$-depleted air from an exhaust manifold channel 71 that receives gas from the intermediate channels 64. Selected regions 66 of the combustion chamber 56 are filled, or coated, with a suitable catalyst (e.g. Pt). The precise location of the catalyst is chosen so as to promote uniform heating of the combustion chamber without premature combustion of the hydrogen in the vicinity of the inlet 68 to the combustion chamber 56. The channels will preferably have a mean hydraulic radius of at least about 0.24 mm, and most preferably about 2 mm to avoid the effects of capillarity, and promote better drainage. A Pt-catalyst loading of at least about 0.08 mg/cm$^2$ is needed to achieve low temperature light-off of the catalyst. A Pt loading of at least about 0.4 mg/cm$^2$ is preferred. Preferably, a hydrophobic coating (e.g. PTFE) 58 is applied to either part 57 and/or 59 to facilitate drainage of product water from the chamber 56.

Figure 3:
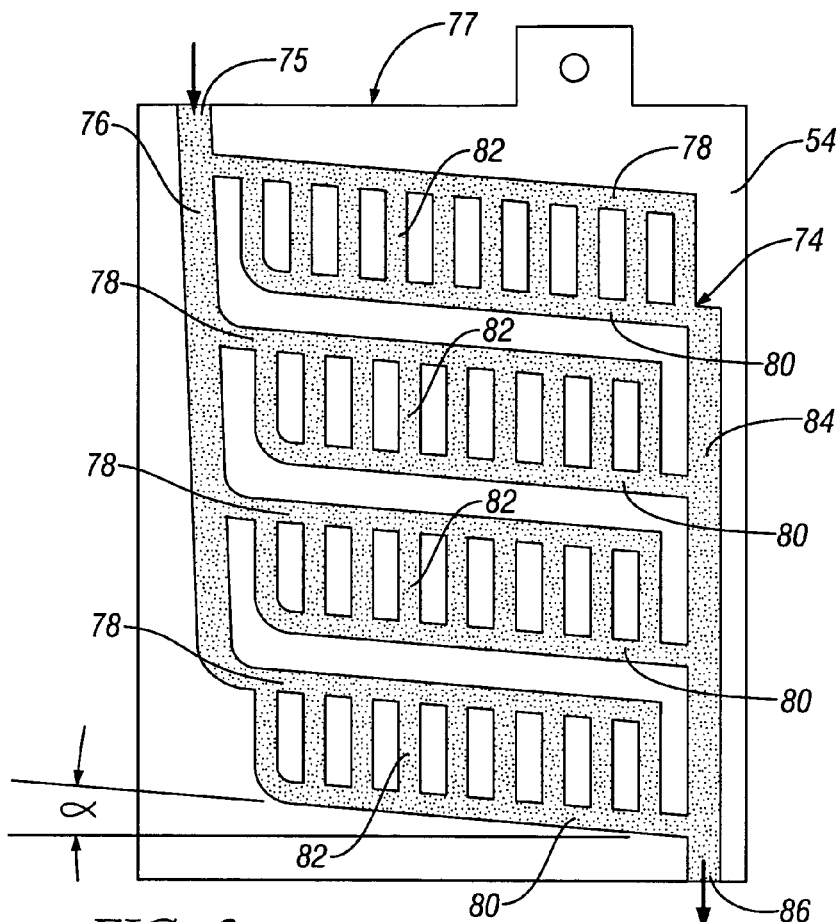
FIG. 3 is a front view of another current-collecting terminal plate in accordance with the present invention.

FIG. 3 depicts a preferred embodiment of a current-collecting terminal plate 54 having a combustion chamber 74 configured to facilitate draining off of any water that forms therein. More specifically, the combustion chamber 74 has an inlet 75 at its upper end 77, and comprises an inlet manifold channel 76 that supplies the $H_2$-Air mix to a plurality of header channels 78, which, in turn, supply the $H_2$-air mix to footer channels 80 via a plurality of intermediate channels 82 extending between the header and footer channels. An exhaust manifold channel 84 collects residual gases exiting the footer channels 80 and directs them toward an outlet 86 at the lower end of the combustion chamber 74. The several footer channels 80 all slope downwardly toward the outlet 86 to promote ready drainage toward the outlet 86. The slope $\alpha$ of the footer channels can vary from 1 to 89 degrees, but will preferably be about 20 degrees.

Figure 4:
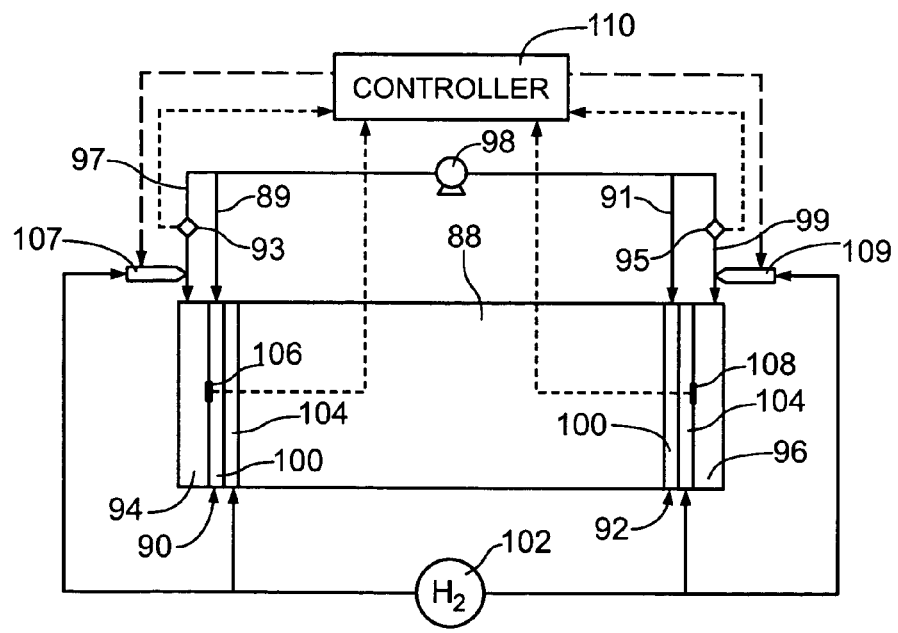
FIG. 4 is a schematic illustration of one control strategy for practice of the present invention.

FIG. 4 depicts a preferred control scheme for practicing the present invention, and shows a fuel cell stack 88 having end cells 90 and 92 engaging combustion-chamber-containing, current-collecting terminal plates 94 and 96, respectively. A compressor 98 supplies air to the cathode sides 100 of the stack's end cells via lines 89 and 91, and to the combustion chambers within the terminal plates 94 and 96 via lines 97 and 99. Fixed-size orifices 93 and 95 are positioned in the air lines 97 and 99 leading to the combustion chambers in the terminal plates 94 and 96 the pressure drop ($\Delta p$) measurements across the fixed-size orifices are used to measure the air flow to the combustion chambers, which air flow varies with compressor speed. Other flow measuring devices/techniques (e.g. rotometers, hot wire closed loop valves, etc.) could be used instead of the fixed orifice/$\Delta p$ technique. Control signals from the flow measuring devices indicative of air flowrates to the combustion chambers are sent to a controller 110. A hydrogen source 102 (e.g. storage tank, reformer etc.) supplies $H_2$ to the anode sides 104 of the inboard and end cells and to $H_2$ injectors 107 and 109 that inject controlled amounts of $H_2$ into the air entering the combustion chambers in the terminal plates 94, 96. Temperature sensors 106 and 108 measure the temperature of the end cells 90 and 92, and report that temperature to the controller 110. Using appropriate look-up tables stored in the controller 110 and containing empirically-obtained air flow vs. pressure drop data across the orifices 93, 95, the amount of $H_2$ needed to keep the hydrogen-air combustion mixture below the LEL is determined. The injectors 93 and 95 are then modulated by the controller 110 to inject that amount of $H_2$ into the air entering the combustion chambers. Alternatively, a speed sensor (not shown) is coupled to the compressor, and the compressor's speed used as a telltale of the air flow rate to the combustion chambers. Then, using look-up tables in the controller 110 that correlate compressor speed to air flow to the combustion chambers, the amount of $H_2$ needed to keep the combustion mixture below the LEL is determined, and injected into the air streams to the combustion chambers. $H_2$ flow to the combustion chambers is terminated after the end cells have reached their prescribed target temperatures. After the $H_2$ flow has ceased, air flow preferably continues through the combustion chambers for a period of time sufficient to purge them of any residual water remaining therein. Thereafter, air flow to the combustion chambers ceases.

Figure 5:
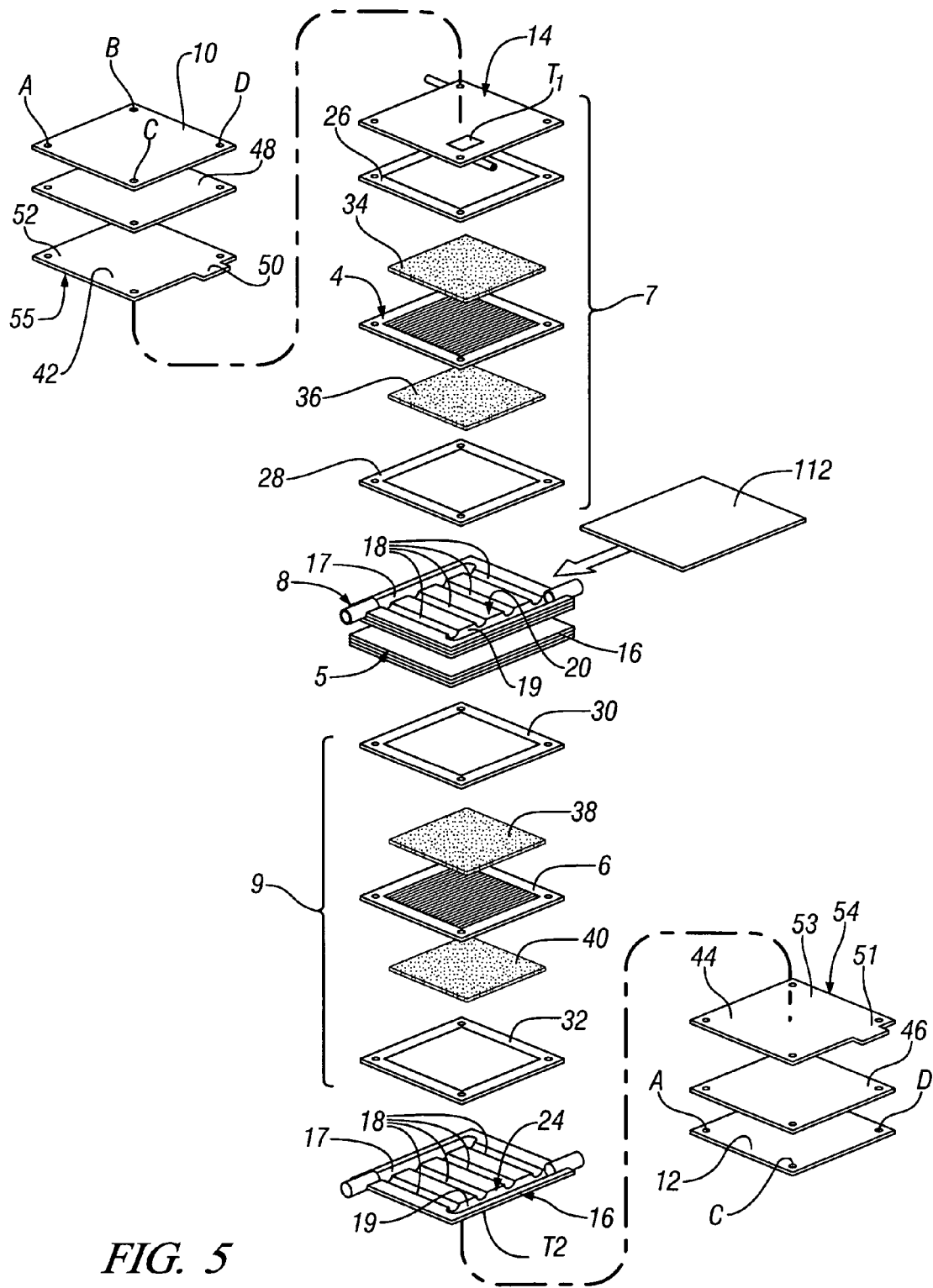
FIG. 5 is an exploded, isometric view of another embodiment of a combustion-thawed PEM fuel cell stack.

FIG. 5 depicts another embodiment of the present invention and is essentially the same as described (with the same numbering) in FIG. 1 with the sole exception that FIG. 5 further shows a combustion heater plate 112 being inserted into, and positioned in, the midst of the pack of inboard cells 5 so as to be sandwiched between a pair of adjacent inboard cells. A plurality of such heater plates 112 may be located at intervals throughout the stack to provide additional heat in extremely cold conditions.

The controller used with the invention may either be a controller that is dedicated strictly to the combustion thawing technique of the present invention, or, preferably, will be a central controller that is used to control the many aspects of the entire fuel cell system—not just stack thawing. A suitable such central controller contains the necessary hardware and software for receiving inputs, converting inputs to other values correlated to inputs, summing inputs, generating internal signals based on those inputs, conditioning (i.e. integrating/differentiating) the internal signals to provide smooth output signals, and whatever other functions might be needed to control the fuel cell system, including the thawing routine of the present invention. Such a controller may take the form of a conventional general purpose, digital, computer-based controller programmed to periodically carry out a prescribed process, and include such well known elements as: (1) a central processing unit (CPU) with appropriate arithmetic and logic circuitry for carrying out arithmetic, logic, and control functions; (2) read-only memory (ROM); (3) read-write random access memory (RAM); (4) electronically programmable read only memory (EPROM); and (5) input and output circuitry which interfaces with the air compressor, thermo sensors, injectors, and clock(s)/timer(s), inter alia. The ROM contains the instructions read and executed by the CPU to implement the several processes carried out by the controller. The EPROM contains appropriate look-up tables, and any needed calibration constants, for converting and comparing appropriate inputs/outputs. The controller processes the input signals to provide appropriate output control signals for the $H_2$ injectors.

The above-described embodiments have shown the combustion chambers located in the current collecting terminal plates 52, 54, and in separate plate(s) 112 strategically located amidst the inboard cells to provide heat thereto under extreme cold-starting conditions. However, combustion chamber location is not limited thereto. Rather, the combustion chambers could alternatively be located in the monopolar cell end plates for heating the end cells, as well as in one or more of the bipolar plates/electrodes for heating the inboard cells.

While even a small amount of end cell heating is helpful to some extent, a large amount of heat is needed if the stack is to be thawed in a short period of time. For example, for customer satisfaction reasons, a motive power, fuel cell stack used to power an electric vehicle should be completely thawed out, and ready to deliver motive power, in no more than about two minutes. For a PEM fuel cell made from Delrin® insulators 46, 48, aluminum terminal plates 52, 54, titanium cell end plates 14, 16, and Gore 5510 membrane-electrolyte, it has been determined that to achieve thaw times of about 2 minutes a minimum heat input of at least about 0.043 BTU per min. per $cm^2$ of cell active area (i.e. 0.043 $BTU/min/cm^2$) is needed. This corresponds to a minimum flow rate of 0.114 standard liters per minute per square centimeter ($slpm/cm^2$) of air (i.e. 0.00246 $g/sec-cm^2$ of air), and 0.004 $slpm/cm^2$ of $H_2$ (i.e. 0.0000625 $g/sec-cm^2$ of $H_2$). When a fixed orifice is used for flow measurement, that orifice (as well as its associated combustion chamber) must be sized to accommodate such flow rates. At the 0.043 $BTU/min/cm^2$ level, a 34 BTU/hr combustor is needed on each end of a stack of 800 $cm^2$ cells (i.e. a total of 68 BTU/hr for both ends). For extremely cold conditions, or when thaw times significantly less than 2 minutes are required, at least one combustion heater amidst the inboard cells, and a heating input of at least about 0.07 $BTU/min/cm^2$ to the end cells, is recommended.

While the invention has been disclosed in terms of specific embodiments thereof, it is not intended to be limited thereto, but rather only to the extent set forth hereafter in the claims which follow.

The invention claimed is:

1. A fuel cell stack comprising:
a pair of end cells sandwiching a plurality of inboard cells therebetween;
an electrically conductive sealed terminal plate including a first part having a combustion chamber formed therein and a second part sealed to the first part for sealing said combustion chamber and forming said electrically conductive sealed terminal plate; said electrically conductive sealed terminal plate engaging one of said pair of end cells and configured for collecting electrical current generated by said stack and for directly, conductively heating said end cells while cold-starting said stack, said first part of said electrically conductive sealed terminal plate comprising:
internal walls defining said combustion chamber, said combustion chamber comprising a plurality of header channels coupled to a plurality of downstream footer channels via a plurality of intermediate channels extending between each of said header channels and said footer channels,
a catalyst in said combustion chamber for promoting an exothermal chemical oxidation of $H_2$,
an inlet to an inlet manifold channel that supplies the header channels of said combustion chamber for admitting a sub-LEL mixture of $H_2$ and air to said combustion chamber, and
an outlet from an exhaust manifold channel that receives gas from said intermediate channels from said combustion chamber for exhausting $H_2O$ and $H_2$-depleted air from said combustion chamber;
a first supply of air from a source of air to said inboard cells; and
a second supply of air from the source of air to said terminal plate.

2. A fuel cell stack according to claim 1 wherein each of said first part and said second part is a monopolar end plate and each of said inboard cells is a bipolar plate.

3. A fuel cell stack according to claim 1 wherein said plurality of footer channels slope downwardly toward said outlet to facilitate drainage of water from said combustion chamber, wherein the slope of said footer channels is from 1 to 89 degrees.

4. A fuel cell stack according to claim 3 wherein said flow channels have a hydraulic radius of at least 0.24 mm.

5. A fuel cell stack according to claim 3 comprising a hydrophobic coating on said walls to promote drainage of water from said flow channels.

6. A fuel cell stack according to claim 1 wherein said catalyst is located at localized areas of said channels selected to achieve substantially uniform heating of said heating face.

7. A fuel cell stack according to claim 1, wherein said first part of said electrically conductive sealed terminal plate is sealed to said second part of said electrically conductive sealed terminal plate by soldering, brazing, welding, or gluing.

8. A fuel cell stack according to claim 1, further comprising at least one combustion heater comprising a combustion chamber sandwiched between a pair of adjacent ones of said inboard cells.

9. A fuel cell system comprising:
a fuel cell stack having a pair of end cells sandwiching a plurality of inboard cells therebetween;
an electrically conductive sealed terminal plate including a first part having a combustion chamber formed therein and a second part sealed to said first part to seal said combustion chamber and form said electrically conductive sealed terminal plate; said electrically conductive sealed terminal plate engaging one of said pair of end cells and configured for collecting electrical current generated by said stack and for directly, conductively heating said end cells while cold-starting said stack, said first part of said electrically conductive sealed terminal plate comprising:

internal walls defining said combustion chamber, said combustion chamber comprising a plurality of header channels coupled to a plurality of downstream footer channels via a plurality of intermediate channels extending between each of said header channels and said footer channels, a catalyst in said combustion chamber for promoting an exothermal chemical oxidation of $H_2$, an inlet to an inlet manifold channel that supplies said header channels of said combustion chamber for admitting a sub-LEL mixture of $H_2$ and air to said combustion chamber, and an outlet from an exhaust manifold channel that receives gas from said intermediate channels from said combustion chamber for exhausting $H_2O$ and $H_2$-depleted air from said combustion chamber;

a compressor for supplying air;

a first supply of air from said compressor to said stack;

a second supply of air from said compressor to said combustion chamber;

an $H_2$-source for providing $H_2$ to said stack and to said second supply of air being supplied to said combustion chamber;

an $H_2$-injector for controlling the a flow of $H_2$ from said source to the said second supply air being supplied to said combustion chamber;

a timer for triggering each said $H_2$-injector to terminate said flow of $H_2$ after a prescribed interval of time has elapsed after said flow of $H_2$ has commenced; and at least one combustion heater comprising a combustion chamber sandwiched between a pair of adjacent ones of said inboard cells.

10. A fuel cell system according to claim 9 wherein each of said first part and said second part is a monopolar end plate and each of said inboard cells is a bipolar plate.

11. A fuel cell system according to claim 9 wherein said plurality of footer channels slope downwardly toward said outlet to facilitate drainage of water from said combustion chamber, wherein said slope of the footer channels is from 1 to 89 degrees.

12. A fuel cell system according to claim 11 further comprising a hydrophobic coating on said internal walls to promote drainage of water from said flow channels.

13. A fuel cell system according to claim 9 wherein said catalyst is located at localized areas of said channels selected to achieve substantially uniform heating of said heating face.

14. A fuel cell system according to claim 9, further comprising at least one combustion heater comprising a combustion chamber sandwiched between a pair of adjacent ones of said inboard cells.

* * * * *